B. F. BERRY.
MACHINE FOR CUTTING SHEET MATERIAL.
APPLICATION FILED SEPT. 25, 1911.

1,200,802.

Patented Oct. 10, 1916.
6 SHEETS—SHEET 1.

Attest:
R. G. Orwig.
N. E. Brockman

Inventor
B. F. Berry
By James L. Hopkins Atty

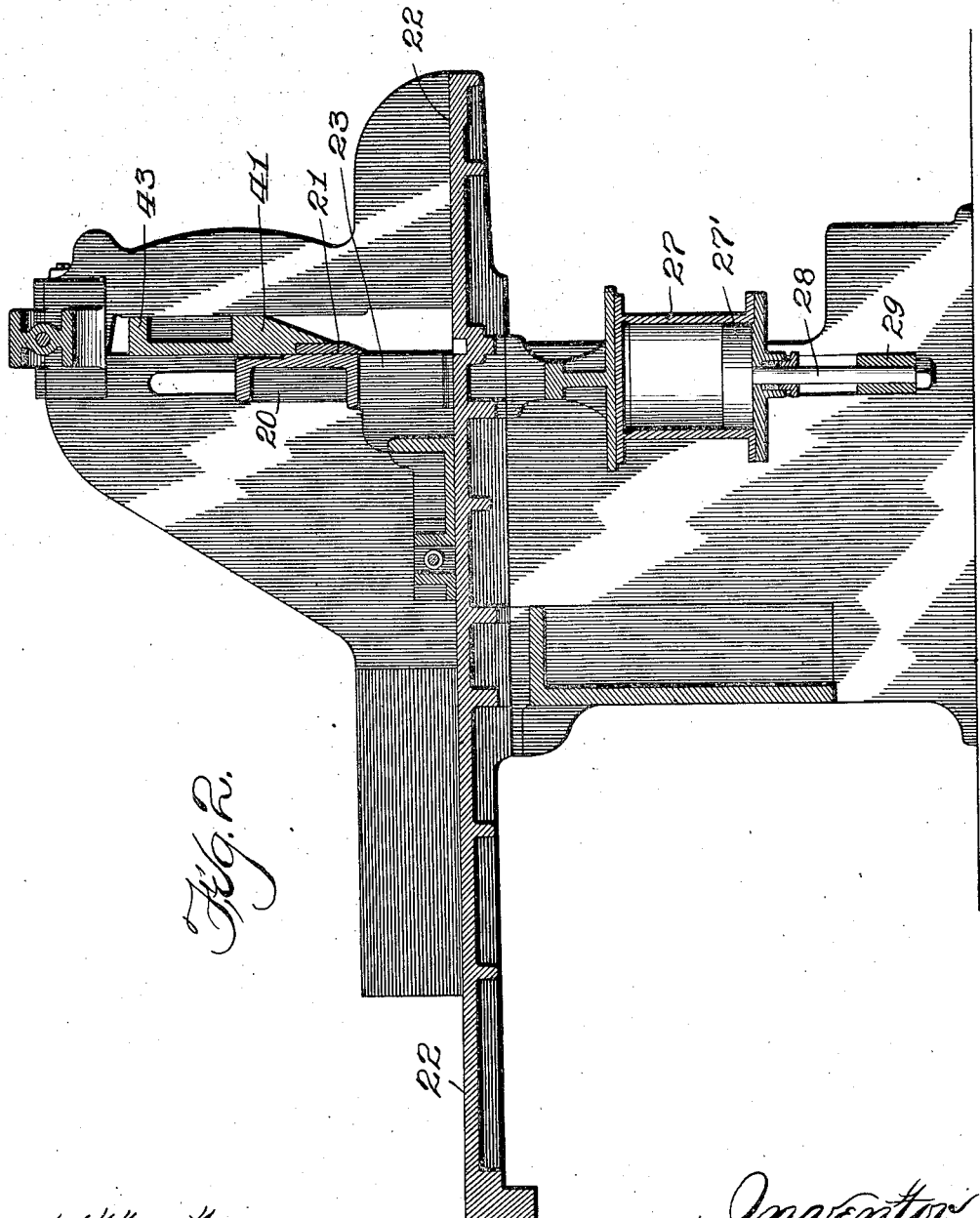

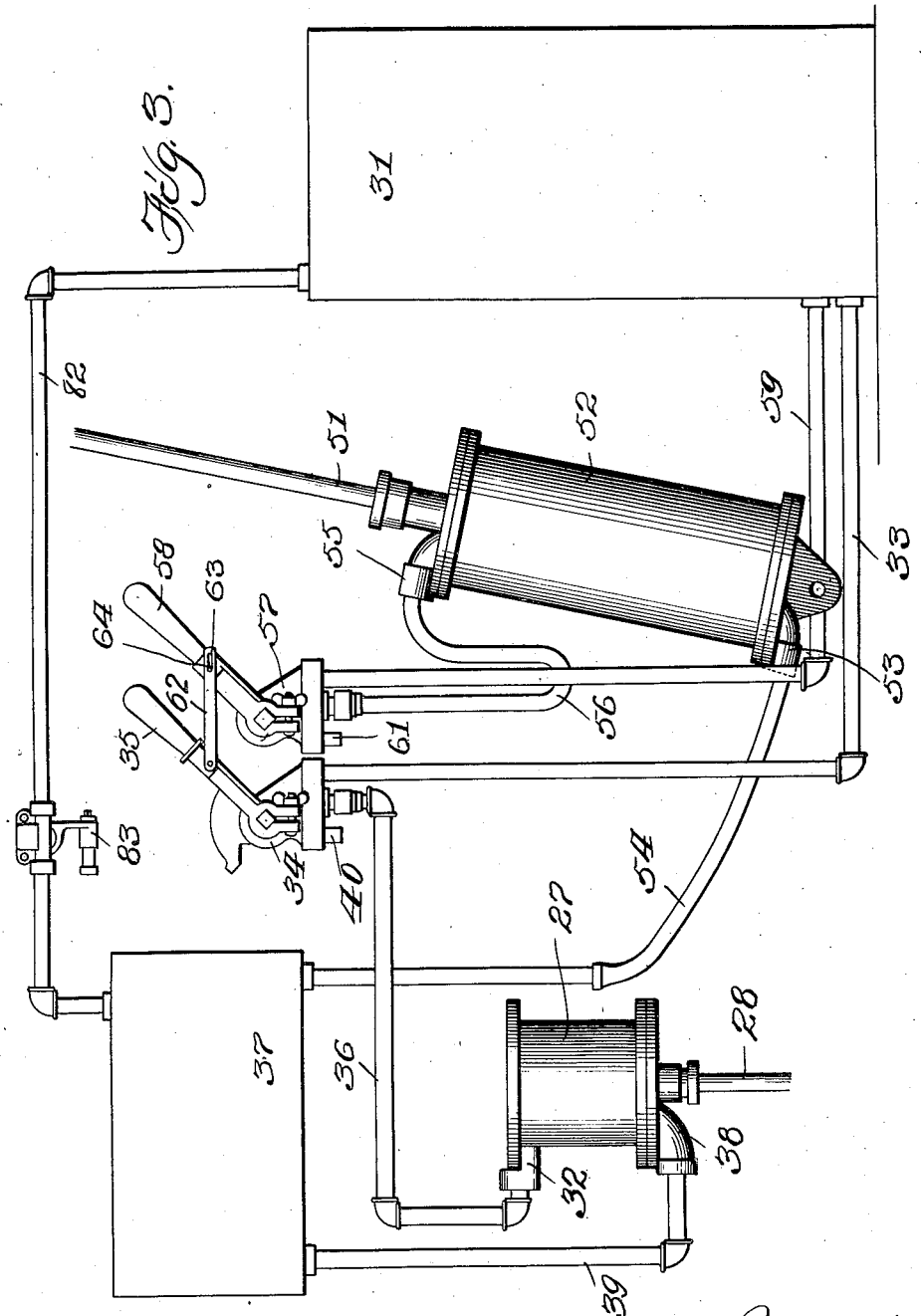

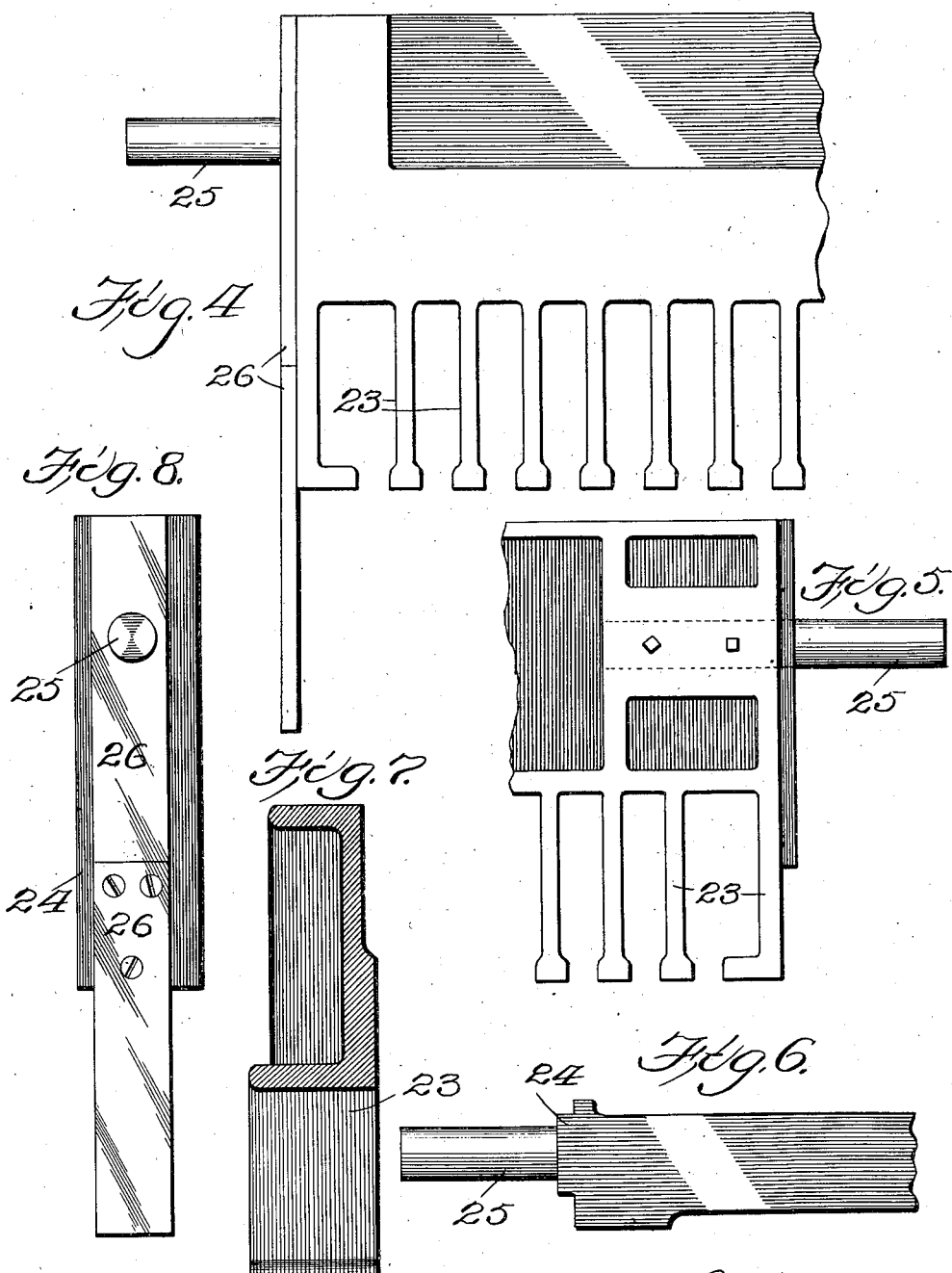

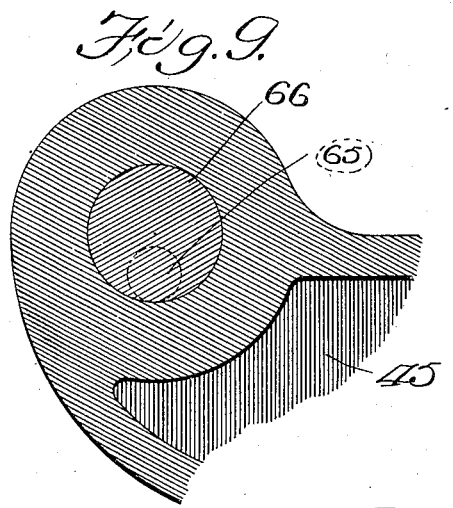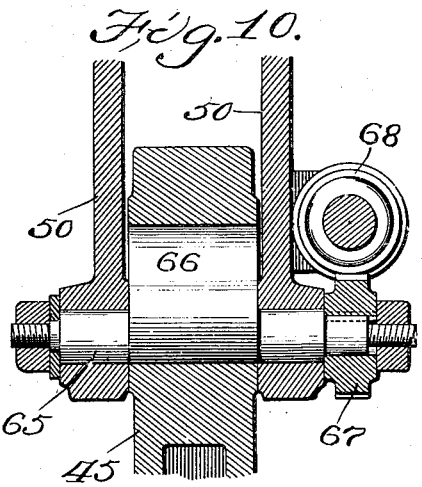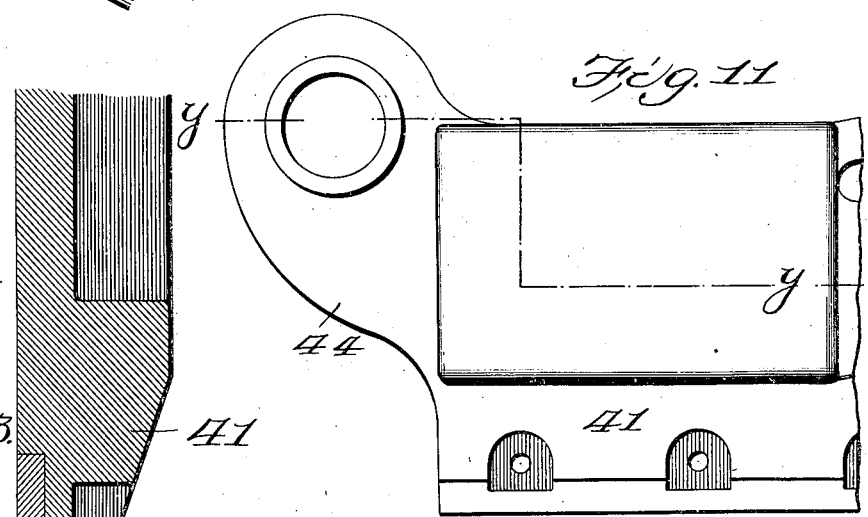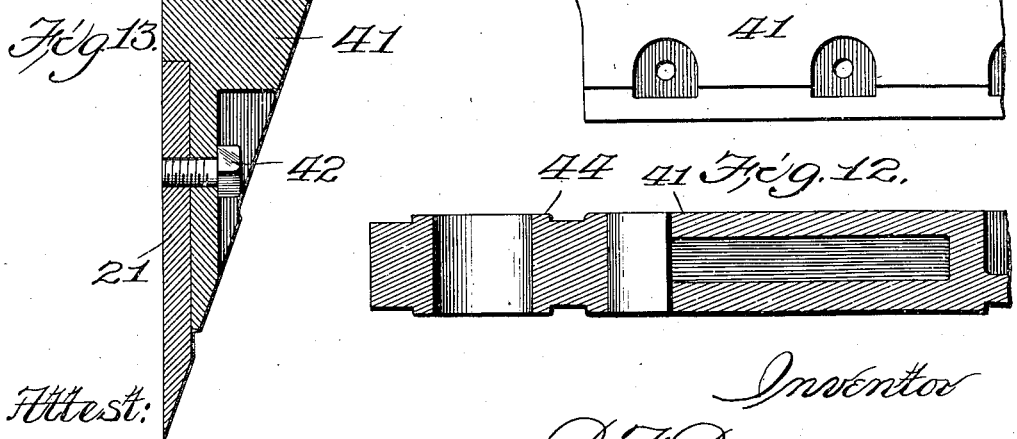

B. F. BERRY.
MACHINE FOR CUTTING SHEET MATERIAL.
APPLICATION FILED SEPT. 25, 1911.

1,200,802.

Patented Oct. 10, 1916.
6 SHEETS—SHEET 6.

Attest:
R. G. Orwig.
N. E. Brockman

Inventor
B. F. Berry
by James L. Hopkins Atty.

UNITED STATES PATENT OFFICE.

BENJAMIN F. BERRY, OF ST. LOUIS, MISSOURI.

MACHINE FOR CUTTING SHEET MATERIAL.

1,200,802.

Specification of Letters Patent.

Patented Oct. 10, 1916.

Application filed September 25, 1911. Serial No. 651,073.

*To all whom it may concern:*

Be it known that I, BENJAMIN F. BERRY, a citizen of the United States, and a resident of St. Louis, Missouri, have invented certain new and useful Improvements in Machines for Cutting Sheet Material, of which the following is a specification.

My invention relates to improvements in machines for cutting sheet material, and has for its object to provide a mechanism operated by a fluid medium and adapted to the accurate and uniform cutting of a plurality of sheets of fabric at a single operation.

Figure 1:
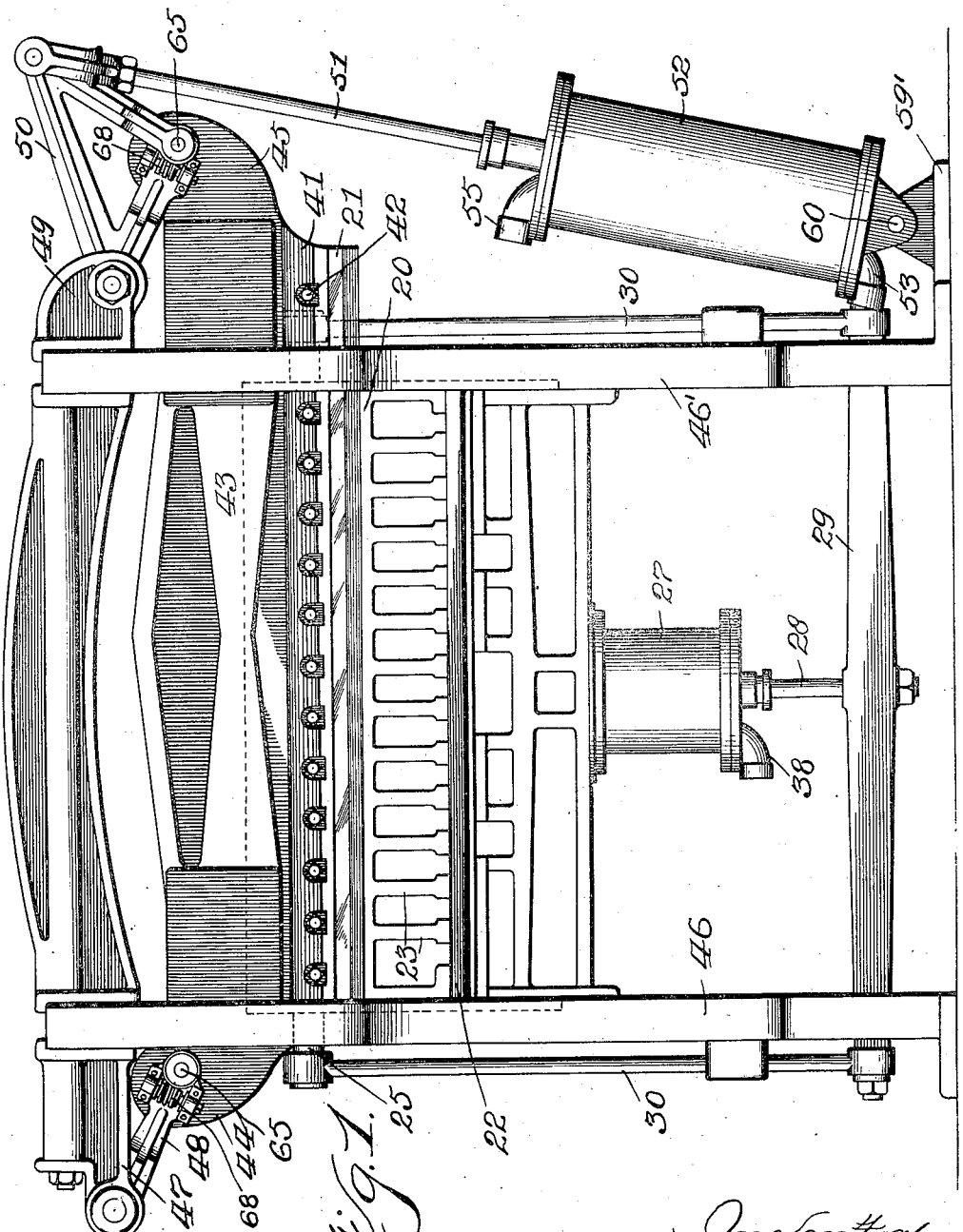
Figure 14:
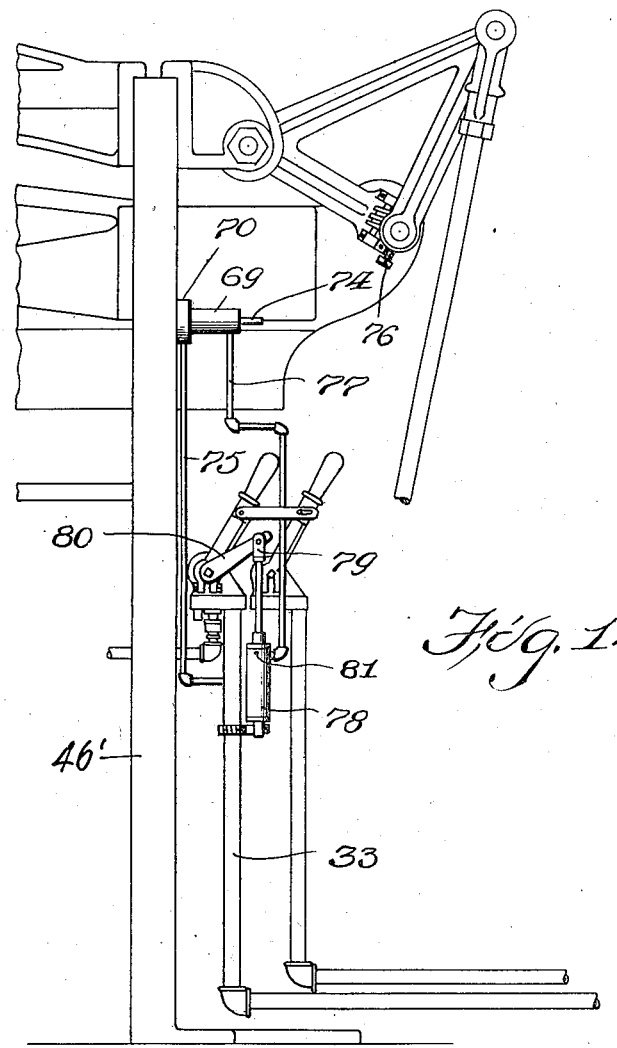
Figure 15:
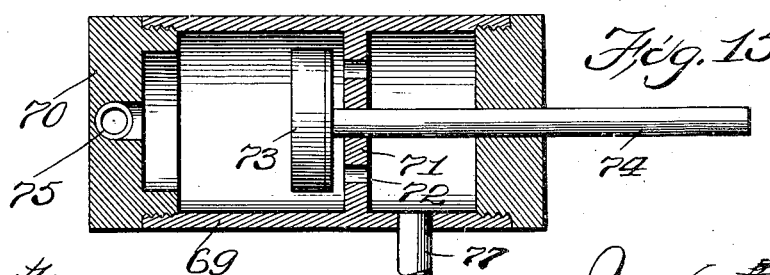

In the drawings Figure 1 is a front elevation of a machine embodying my invention. Fig. 2 is a vertical sectional view of the same taken on the central longitudinal line of the operating table. Fig. 3 is a diagrammatic view of the operating cylinders and their connections. Fig. 4 is a front elevation of one end of the clamping member. Fig. 5 is a rear elevation of the same. Fig. 6 is a top view of the same. Fig. 7 is a sectional view of the clamp-bar. Fig. 8 is an end view of the clamping member. Fig. 9 is a detail of the eccentric shaft whereby the cutting bar is suspended. Fig. 10 is a side view of said eccentric shaft and its connections. Fig. 11 is a plan view of the cutting-bar support. Fig. 12 is a sectional view of the same, taken on the line *y—y* of Fig. 11. Fig. 13 is a sectional view of the cutting-bar in place upon its support. Fig. 14 is a detailed view in elevation of the automatic knife-reversing mechanism. Fig. 15 is a longitudinal sectional view of the valve employed in the same.

As shown in the drawings, my mechanism is directed to the independent operation of the clamp 20 and cutting bar or knife 21 with reference to the upper surface of the operating table 22. The clamp 20 in conjunction with the grill 23 and base-plate 24 forms the clamping member of my mechanism. At each end of the base-plate 24 I provide the outwardly projecting pins 25, and sectional guide-strips 26—26.

Beneath the table 22 depends the cylinder 27, in which operates the piston-rod 28, which in turn serves to raise and lower the horizontal arm 29; whose extremities are connected to the pins 25—25 by the rods 30—30. For the purpose of securing that rigidity of clamping which is necessary in the exact and precise cutting of the finer sheet fabrics, as in the cutting of bonds or bank-notes from paper, or the cutting of gloves from the finer grades of leather, I have provided the means illustrated, which may be thus described. A high-pressure tank 31, charged with air under high compression, is connected to the port 32 of the cylinder 27 by means of the pipe 33, valve 34 (controlled by the hand-lever 35) and pipe 36. The low-pressure tank 37, charged with air at comparatively low compression (the pressure being such as to restore the clamp 20 to its upper position when the air employed in effecting the down-stroke in the cylinder 27 is released) is connected to the bottom port 38 of the cylinder 27 by means of the pipe 39. During the downward movement of the piston-rod 28 the air in the lower portion of the cylinder 27 (beneath the piston-head 27') is forced through the pipe 39 into the tank 37, and when the downward movement had progressed to the desired point, the resistance of the air in the tank 37 prevents the back-lash or slight upward movement of the clamp 20 which occurs in the cutting machines of the prior art, and whose existence leads to the lessening of the pressure of the clamp upon the mass of sheet fabric, and thus produces irregularity in the cutting of the same by the knife mechanism. When the pressure in the upper end of the cylinder 27 is relieved by the reversal of the hand-lever 35 permitting the air to exhaust through the escape-port 40, the air pressure from the tank 37 will elevate the clamp 20 through the connecting mechanism shown. The clamping mechanism thus described subjects the clamp 20 at all times, save when it is in its uppermost position, to balanced resistance, enabling the movement of the clamp 20 to be instantly arrested or reversed, and giving it a capacity for perfect control.

The knife 21 is carried by the knife-bar 41, to which it is detachably secured by screws 42, for the purpose of removal for sharpening, or the substitution of a new knife. The knife-bar 41 is carried by the beam 43, slidably mounted in the standards 46—46'. The beam 43 has ears 44—45. The ear 44 is pivotally suspended from the support 47 by means of the link 48, and the ear 45 is suspended from the support 49 by the walking-beam 50. The walking-beam 50 is actuated by the piston-rod 51 of the cylinder 52, whose mode of operation is the same as that of the cylinder 27; the lower port 53 being connected to the tank 37 by the pipe 54, and the upper port 55 being connected to the tank 31 by the flexible tube 56, valve 57 (controlled by the hand-lever 58) and pipe 59. The pipes 54 and 56 are flexible, to accommodate the horizontal movement of the cylinder 52, which is pivotally mounted upon the bed-plate 59' at the point indicated by the numeral 60. The valve 57 is provided with an exhaust-port 61. The hand-lever 58 may be connected to the hand-lever 35 by a link 62, the link 62 having a longitudinal slot 63 where it engages the pin 64 on the hand-lever 58, so that the movement of the lever 35 will always precede the movement of the lever 58, and hence the movement of the clamp 20 will always precede the movemnt of the knife 21.

By means of the method of suspension and actuation of the knife 21 just described, it is obvious that the knife will operate upon its work with a swinging cut. In order to do its best work, and to prevent injury to its cutting edge, the knife 21 is provided with means for so adjusting it that its cutting edge will just contact with the upper face of the operating table 22. The pins 65—65 carry eccentric disks 66 (see Fig. 9) which are journaled through the ears 44—45. The pins 65—65 are secured to worm-wheels 67 actuated by worms 68, by means of which the eccentric-disks 66 are turned to adjust the knife 21.

I have provided the machine thus described with an automatic means for starting the knife bar 41 upon its return stroke, which may be described as follows: Upon the standard 46' I have mounted a valve housing 69 extending outward horizontally from the base 70, and having midway its length the perforated valve seat 71, whose perforations 72 are normally closed by the valve 73, mounted on the valve-pin 74. A pipe 75 extends from the pipe 33 to the interior of the valve housing 69 at or near its base, thus constantly admitting pressure from the high-pressure tank 31, to maintain the valve 73 and valve-pin 74 in their outer position, in which position the perforations 72 are closed by the valve 73. Upon the lower face of the walking-beam 50 I provide the adjustable screw 76 whose head is adapted to contact with the valve-pin 74, to force the same inwardly, disengaging the valve 73 from its seat 71 and permitting the air pressure from the pipe 75 to pass through the perforations 72 and into the pipe 77. The pipe 77 extends to the upper end of the cylinder 78, whose piston (not shown) controls the rod 79, which in turn actuates the lever-bar 80. The cylinder 78 is provided at its upper extremity with a small vent 81, which permits the escape of the compressed air or other fluid from the interior of the cylinder 78 when the hand-levers 35—58 are reversed by hand to effect the downstroke of the knife 21. In order to maintain a uniform constant low pressure in the tank 37, and a uniform constant high pressure in the tank 31, I have provided between said tanks a communicating pipe 82 which is provided with an equalizing valve 83.

The automatic reversing mechanism which I have described, and which is illustrated in Figs. 14 and 15 may be thrown out of operation at the will of the operator by the inward adjustment, or total removal of the screw 76. Its function is to relieve the operator of the necessity of reversing the levers 35 and 58 when the knife 21 has completed its down stroke, and it is useful in enabling the successive cutting operations of the machine to be performed at a higher rate of speed than can be attained without its use. But where speed is not desired, by reason of the character of the work to be performed, the adjustment or removal of the screw 76 effects the disconnection of the mechanism in question.

In the mechanism as described, the clamp 20 in its downward movement precedes the downward movement of the knife 21, while the upward movement of the knife 21 precedes the upward movement of the clamp 20, the clamp 20 continuing to hold the work which has been cut or trimmed, until the knife 21 in its upward passage is clear of the work. The object attained by this characteristic is to prevent the disturbance of the pile of work which has been cut, by the upward movement of the knife 21. The importance of this function increases in proportion to the narrowness in width of the material cut. Thus, when tags, labels, small cards or other narrow material have been cut, it is of economical importance that the operator should be able to remove the stack or pile undisturbed, and this is impossible where the movement of the clamp releasing the material precedes or is simultaneous with the upward movement of the knife; in such machines the stack or pile of cut material is disturbed or upset by the knife in its upward movement, and the reassembling is done by hand, and involves a costly consumption of time. When the link 62 is disengaged to permit the independent operation of the hand-levers 35 and 58, the clamp 20 may be independently operated, and may be used for a preliminary crushing or compression of the mass of material which is subsequently to be trimmed by cutting. This function renders the machine peculiarly adapted to use in book-binding. By reason of the swinging character of the cut of the knife 21, it is possible to attain a uniform pressure throughout the cutting operation, through the lowest sheets in the pile to be cut; the knife 21 being so adjusted by the pins 65—65 that the knife will barely contact with the upper surface of the operating table 22, thus prolonging the life of the knife, and reducing the frequency of its sharpening, the final path of the stroke of the knife 21 being approximately parallel and in contact with the upper surface of the operating table 22.

Having thus described my invention, what I claim as novel, and desire to have secured to me by the grant of Letters Patent, is:

1. In a machine for cutting sheet material, a link-suspended knife; a table to and from which said knife operates; a high pressure fluid tank; a low pressure fluid tank; and means for alternately moving said knife by the pressure from one of said tanks, during which movement said knife is cushioned against resistance from the other of said tanks.

2. In a machine for cutting sheet material, the combination of a table; a clamp; a link-suspended knife; a high pressure fluid tank adapted to independently drive said clamp and said knife toward said table; a low pressure fluid tank adapted to restore said clamp and knife, to inoperative position, and means for alternately moving said knife by the pressure from one of said tanks, during which movement said knife is cushioned against resistance from the other of said tanks.

3. In a machine for cutting sheet material, the combination of a table; a pneumatic operated clamp; a link-suspended knife; a high pressure fluid tank; a low pressure fluid tank; controllable means for actuating said clamp and knife by the pressure of the contents of said tanks, said knife being moved by the pressure from one of said tanks and cushioned during said movement against resistance from the other of said tanks.

4. In a machine for cutting sheet material, the combination of a table; a clamp; a stationary piston mechanism actuating said clamp; a swingingly-suspended knife; and a flexibly mounted piston mechanism actuating said knife.

5. In a machine for cutting sheet material, the combination of a table; a clamp; means for operating said clamp toward and from said table; a swingingly-suspended knife; a piston connected to said knife; a flexibly mounted cylinder containing said piston; and controllable means for actuating said piston within said cylinder.

6. In a machine for cutting sheet material, the combination of a table; a clamp; means for operating said clamp toward and from said table; a link-suspended knife; a piston connected to said knife; a flexibly mounted cylinder containing said piston; and controllable means for actuating said piston within said cylinder.

7. In a machine for cutting sheet material, the combination of a table; a clamp; means for interposing uniform resistance between the clamp and the table; and controllable means for propelling the clamp toward the table against said resistance, opposing forces exerted upon said clamp being adjusted to permit of its immediate stoppage during its movement toward the table, substantially as described.

8. In a machine of the class described, a table; a knife; means for interposing uniform resistance between the knife and the table; controllable means for propelling the knife toward the table against said resistance, said last-named means being arranged and adjusted to permit of the sudden stoppage of said knife during its movement toward the table.

9. In a machine for cutting sheet material, a table; a knife; link members whereby the knife is suspended; revoluble eccentric adjustable connections interposed between the knife and the link members; means for interposing uniform resistance between the knife and the table; and controllable means for propelling the knife toward the table against said resistance.

10. In a machine for cutting sheet material, the combination of a table; a clamp; a link suspended knife; means for interposing uniform resistance between said clamp and said table; means for interposing constant resistance between said knife and said table; and means for independently propelling said clamp and said knife toward said table against said resistance, substantially as described.

11. In a machine for cutting sheet material, the combination of a table; a clamp; a link suspended knife; means for interposing uniform resistance between said clamp and said table; means for interposing constant resistance between said knife and said table; and means for successively propelling said clamp and said knife toward said table against said resistance, substantially as described.

12. In a machine for cutting sheet material, the combination of a table; a clamp; a knife; means for interposing constant resistance between said clamp and said table; means for interposing constant resistance between said knife and said table; means for successively propelling said clamp and said knife toward said table against said resistance; and means actuated by the downward movement of said knife for reversing the movement of said clamp and said knife, substantially as described.

13. In a machine for cutting sheet material, the combination of a table; a clamp; a tank containing fluid under relatively high pressure; means connecting said tank with said clamp, for effecting the movement of the clamp toward the table; a tank containing fluid under relatively low pressure; a connecting means whereby fluid from the last named tank is applied to the clamp to oppose the pressure from the first named tank; a flexibly mounted knife; a high pressure fluid tank having action with said knife; a low pressure fluid tank having action with said knife, and whose pressure is opposed to the pressure from said high pressure tank; and means for controlling the pressure from said several tanks, and operating said clamp and knife thereby.

14. In a machine for cutting sheet material, in combination, a table; a clamp; a stationary piston mechanism actuating said clamp; a swingingly-mounted knife; a flexibly mounted piston mechanism actuating said knife; a high pressure tank connected with said piston mechanism; a low pressure tank connected with said piston mechanism; and a valve control whereby said connections may be simultaneously or independently operated.

15. In a machine for cutting sheet material, in combination, a table; a clamp; a stationary mechanism actuating said clamp; a swingingly-mounted knife; a flexibly mounted piston mechanism actuating said knife; a high pressure tank connected with said piston mechanism; a low pressure tank connected with said piston mechanism; a valve control whereby said connections may be simultaneously or independently operated; a connection between said tanks; and an equalizing valve seated in said connection.

In testimony whereof I have signed my name to this specification, in presence of two subscribing witnesses.

BENJAMIN F. BERRY.

Witnesses:
N. E. BROCKMAN,
R. G. CRUIG.